(12) United States Patent
Graveleau

(10) Patent No.: US 8,382,984 B2
(45) Date of Patent: Feb. 26, 2013

(54) METHOD AND INSTALLATION FOR BIOLOGICALLY TREATING WASTE WATER

(75) Inventor: Laure Graveleau, Fresnes (FR)

(73) Assignee: Degremont, Paris la Defense (FR)

( * ) Notice: Subject to any disclaimer, the term of this patent is extended or adjusted under 35 U.S.C. 154(b) by 416 days.

(21) Appl. No.: 12/670,870

(22) PCT Filed: Jul. 25, 2008

(86) PCT No.: PCT/FR2008/001113
§ 371 (c)(1),
(2), (4) Date: Apr. 10, 2010

(87) PCT Pub. No.: WO2009/047406
PCT Pub. Date: Apr. 16, 2009

(65) Prior Publication Data
US 2010/0200496 A1    Aug. 12, 2010

(30) Foreign Application Priority Data

Jul. 30, 2007    (FR) ...................................... 07 05551

(51) Int. Cl.
*C02F 3/30* (2006.01)

(52) U.S. Cl. ........ 210/605; 210/615; 210/623; 210/150; 210/260; 210/903; 210/906

(58) Field of Classification Search ................ 210/605, 210/614, 615, 616, 617, 623, 150, 151, 252, 210/259, 260, 903, 906
See application file for complete search history.

(56) References Cited

U.S. PATENT DOCUMENTS

| 4,167,479 | A | | 9/1979 | Besik | |
|---|---|---|---|---|---|
| 5,098,572 | A | * | 3/1992 | Faup et al. | 210/605 |
| 6,569,335 | B1 | * | 5/2003 | Johnson | 210/614 |
| 6,758,972 | B2 | * | 7/2004 | Vriens et al. | 210/605 |

FOREIGN PATENT DOCUMENTS

| EP | 0861808 A2 | 9/1998 |
|---|---|---|
| JP | 56081188 A | 7/1981 |
| JP | 04040295 A | 2/1992 |
| JP | 10202281 A | 8/1998 |
| JP | 2006167551 A | 6/2006 |
| WO | WO-9615991 A1 | 5/1996 |

* cited by examiner

*Primary Examiner* — Fred Prince
(74) *Attorney, Agent, or Firm* — Novak Druce Connolly Bove + Quigg LLP

(57) ABSTRACT

The invention relates to a method for biologically treating waste water, using a set of micro-organisms having different metabolic spectra, in order to eliminate carbon and nitrogen, even phosphorus. Some of the micro-organisms are fixed to mobile solid carriers (2) and form a fluidised fixed biomass. Some of the micro-organisms are free to be used in an activated mud treatment. To this end, a first non-aerated treatment zone (21a) is followed by a second aerated treatment zone (21b); the treated effluent is subjected to a solid/liquid separation by flotation (6) at a speed higher than 10 m/H; and part of the mud recovered by flotation is recirculated (8) towards the activated mud treatment, said recirculation being controlled (9, 10, 11) so that the MES concentration of the effluent subjected to the liquid/solid separation remains compatible with the retained flotation.

12 Claims, 1 Drawing Sheet

METHOD AND INSTALLATION FOR BIOLOGICALLY TREATING WASTE WATER

CROSS REFERENCE TO RELATED APPLICATIONS

This application is a National Phase filing under 35 U.S.C. §371 of PCT/FR2008/001113 filed Jul. 25, 2008, which claims priority to Patent Application No. 07/05551, filed in France on Jul. 30, 2007. The entire contents of each of the above-applications are incorporated herein by reference.

The invention relates to a process for purifying wastewater via a biological treatment that uses a set of microorganisms in order to remove carbon and nitrogen, or even phosphorus, a portion of the microorganisms being fixed to movable solid supports and constituting a fluidized fixed biomass.

The biological treatment of water aims to remove carbon, nitrogen or even phosphorus owing to the metabolic activity of a set of bacteria that have different metabolic spectra. These characteristics impose specific operating conditions and in particular hydraulic and biological residence times that make it necessary to increase the number of works. This leads, as drawbacks, to high construction costs and a large site coverage.

The development of biological processes that enable a bacterial growth in the form of a biofilm fixed to movable solid supports, in particular as shown by EP 0 575 314, has made it possible to envisage conditions of low mass loading with treatment works of smaller size. The load removed is thus expressed in kgCOD/m$^3$ of materials/day. The supply of oxygen is furthermore increased beyond the metabolic requirements in order to allow a good homogenization of the supports in the reactor. The high cost of the supports represents a very large part of the total construction cost of the plant and very often constitutes a limit to the uptake of the process. The conditions for removing nitrogen furthermore impose the addition of external carbon (of methanol type) in order to satisfy the denitrification efficiencies, which is detrimental to the operating cost.

Various alternatives to the conventional activated sludge process are envisaged in order to overcome the aforementioned drawbacks: for example, the addition of membrane processes in the biological reactor or to the recirculation of sludges.

These processes require significant washing phases that are detrimental to their overall profitability.

The carbon-based fraction is present in water in soluble and dissolved form and is estimated by the COD (chemical oxygen demand). Heterotrophic bacteria are capable of assimilating this carbon under aerobic conditions or in the presence of nitrates thus permitting the denitrification of the aquatic medium. Depending on the COD/biomass ratio present in the reactor, their oxygen requirement is higher or lower: when this ratio is low (low mass loading) the oxygen requirement for degrading a same amount of COD is almost 40% higher than that needed in the case of a high ratio (high mass loading). Thus, the assimilation of carbon is more economical under high mass loading conditions. It should be noted that under these conditions, the carbon removal efficiency is of the order of 75 to 85%.

The treatment of nitrogen requires a first step known as nitrification, which consists in biologically oxidizing the ammonium in the form of nitrites and/or nitrates. The bacteria that carry out this step have a low growth rate, requiring them to be kept in the system for a long period and giving rise, therefore, to low mass loading conditions. The second step, known as denitrification, requires available carbon in order to carry out the reduction of the nitrites and/or nitrates to gaseous nitrogen. The kinetics of denitrification are of the same order of magnitude as those of nitrification.

A thorough treatment of the carbon under low mass loading conditions is not always compatible with denitrification and gives rise to the addition of external carbon in the form of methanol for example, which represents, besides an additional operating cost, significant constraints in terms of safety in the area around the plant.

The objective of the invention is, above all, to optimize the volumes of the reactors and the supply of oxygen.

This optimization is obtained by coupling together conditions of high mass loading of free culture and a nitrogen treatment under conditions of low mass loading by the fluidized fixed biomass. The free culture is recirculated from a sludge flotation system, carried out in a unit with a rate greater than 10 m/H. The recirculation is controlled so that the concentration is compatible with the flotation system used.

According to the invention, the process for purifying wastewater via a biological treatment that uses a set of microorganisms that have different metabolic spectra, in order to remove carbon and nitrogen, or even phosphorus, a portion of the microorganisms being fixed to movable solid supports and constituting a fluidized fixed biomass, is characterized in that:

another portion of the microorganisms is free for an activated sludge type treatment;

a first non-aerated treatment zone is provided, followed by a second aerated treatment zone;

the treated effluent is subjected to a solid/liquid separation via flotation at a rate greater than 10 m/H; and a portion of the sludge recovered by flotation is recirculated to the activated sludge treatment, this recirculation being controlled so that the SM (suspended matter) concentration of the effluent subjected to the liquid/solid separation remains compatible with the flotation used.

Preferably, conditions of high mass loading or free culture and a nitrogen treatment under conditions of low mass loading by the fluidized fixed biomass are coupled together. The high mass loading corresponds, preferably, to a loading greater than 0.4 kgBOD$_5$·kg$^{-1}$VM·d$^{-1}$.

Advantageously, the recirculation of sludge recovered by flotation to the activated sludge treatment is controlled so that the SM concentration of the effluent subjected to the flotation remains between 0.3 g/L and 1.5 g/L.

Provision may be made for the first non-aerated treatment zone to be a high-loading anoxic treatment zone, for removing most of the carbon and some of the nitrogen mainly by action of heterotrophic bacteria, followed by the second aerated treatment zone for removing nitrogen.

The two treatment zones may be physically separate.

A fraction of the nitrates produced in the second aerated treatment zone may be recirculated to the first anoxic treatment zone.

Advantageously, the SM concentration is measured in the first high-loading anoxic treatment zone and the degree of recirculation of the sludge recovered by flotation is controlled so as to keep the SM concentration within the desired range.

The invention also relates to a wastewater purification plant comprising a biological reactor containing a set of microorganisms that have different metabolic spectra, in order to remove carbon and nitrogen, or even phosphorus, a portion of the microorganisms being fixed to movable solid supports and constituting a fluidized fixed biomass, characterized in that:

another portion of the microorganisms is free for an activated sludge type treatment;

the biological reactor comprises a first non-aerated treatment zone followed by a second aerated treatment zone;

the plant comprises, downstream of the biological reactor, a flotation unit having a separation rate greater than 10 m/H which receives the effluent exiting the biological reactor;

a circuit is provided in order to recirculate some of the sludge recovered from the flotation unit to the biological reactor; and means are provided for keeping the SM concentration of the effluent in a range compatible with the flotation.

Preferably, the SM concentration of the effluent subjected to the flotation is kept between 0.3 g/L and 1.5 g/L.

The means for keeping the SM concentration of the effluent subjected to the flotation within a given range may comprise:

a means for measuring the SM concentration in the biological reactor;

a controller to which the result of the measurement is sent; and a pump, controlled by the controller, for the recirculation flow.

Advantageously, the first non-aerated treatment zone is a high-loading anoxic zone for removing most of the carbon and some of the nitrogen mainly by action of heterotrophic bacteria, followed by a second aerated treatment zone for removing nitrogen.

The two treatment zones may be physically separate. A fraction of the nitrates produced in the second aerated treatment zone may be recirculated to the first anoxic treatment zone.

This system has, on the one hand, the advantage of naturally producing little excess sludge, this sludge being, on the other hand, highly fermentable and therefore a potential source of carbon that can be used for the denitrification after specific treatment.

The invention proposes a novel solution that combines the advantages of the fixed culture for the treatment of nitrogen (nitrification and denitrification) and those of an activated sludge with high loading upstream, in order to improve the overall treatment. This combination allows a significant reduction in the size of the works and in the oxygen requirements and furthermore allows the use of a system for separating the biomass at high speed by sludge flotation, that is compatible with the objective of reducing the size of the treatment works and the objective of the quality of the discharges as regards the phosphorus concentration.

The supports of the fixed biomass are retained in the reactor whilst the treated water and the free biomass are directed to the high-speed separation flotation system, depending on the requirements of the treated water quality.

The flotation system has a significantly smaller volume than a conventional clarifier and the possible addition of reactant ensures an optimal treatment quality and offers the possibility of removing the excess phosphorus by precipitation.

The upstream high-loading zone is useful for enabling a hydrolysis of the dissolved, or even particulate, organic matter conveyed by the wastewater. This pre-hydrolysis under anoxic conditions produces readily assimilated organic matter necessary for the denitrification step and improves the kinetics of nitrification via the autotrophic bacteria in the aerated zone.

Furthermore, some of the nitrates are degraded in this upstream high-loading zone accordingly reducing the amount of supports in the anoxic zone.

The complete treatment of the nitrogen (nitrification and denitrification) may be advantageously obtained either by a sequenced aeration or by a channel type configuration that permits the use of the residual carbon after the high loading for the denitrification.

Besides the saving in terms of the size of the works and the supply of oxygen, the invention makes it possible to even out, owing to the high loading, the variations in organic loading that are often observed and that are favorable to malfunctions of filamentous type in prolonged aeration treatments, and in fixed cultures to limit the development of a loose biofilm that is not very resistant to the abrasion forces experienced in the aerated or anoxic reactor.

Depending on the operating conditions and the discharge standards for the treated water, it is possible to separate the high loading zone from that having a fixed culture and to establish preferential circulations of the supports, of the liquid phase and of the solid phase.

The invention consists, excluding the arrangements explained above, of a certain number of other arrangements which will be discussed more explicitly below in regard to exemplary embodiments described with reference to the appended drawing, but which are in no way limiting. In this drawing.

Figure 1:
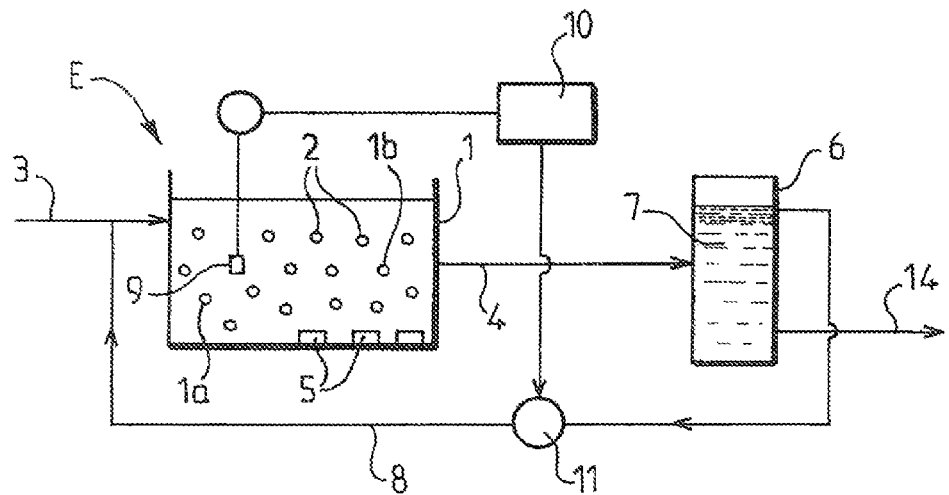
FIG. 1 is a diagram of a plant according to the invention.

With reference to FIG. 1 of the drawing, a plant E can be seen for purifying wastewater which comprises a biological reactor 1 containing a set of microorganisms that have different metabolic spectra in order to remove carbon and nitrogen, or even phosphorus. A portion of the microorganisms is fixed to movable solid supports 2 represented schematically by circles in the drawing. The inlet for the water to be treated is provided by a pipe 3. The outlet for the treated effluent is provided by a pipe 4. A retaining screen (not represented) is provided at the outlet for the treated effluent in order to keep the supports 2 in the reactor 1.

Another portion of the microorganisms is free in the liquor of the reactor 1 for an activated sludge type treatment.

The reactor 1 comprises a first non-aerated treatment zone 1a located on the side of the inlet pipe 3. This zone is advantageously provided for a high-loading anoxic treatment. This anoxic zone does not comprise, in the bottom of the reactor, aeration means for injecting air.

The high loading corresponds to a mass loading greater than $0.4 \text{ kg BOD}_5 \cdot \text{kg}^{-1} \text{VM} \cdot \text{d}^{-1}$. The letter d corresponds to "day", BOD corresponds to the biochemical oxygen demand, and $BOD_5$ corresponds to the amount of oxygen consumed after five days of incubation. VM corresponds to the content of volatile matter which is an approximate evaluation of the organic matter (see "Memento technique de l'eau" [Water treatment handbook] 10th edition, DEGREMONT SUEZ, volume 1, pages 418-419, and pages 534-535).

This first high-loading anoxic treatment zone makes it possible to remove most of the carbon and some of the nitrogen oxidized mainly by reaction of heterotrophic bacteria. The first zone 1a is followed by a second aerated treatment zone 1b for oxidation of the nitrogen, essentially by autotrophic bacteria. The second zone 1b comprises, in the bottom, aeration means constituted, for example, by devices for blowing air into the liquor located above.

The treated effluent, exiting via the pipe 4 from the reactor 1, is sent to a flotation system 6, the solid/liquid separation rate of which is greater than 10 m/H. Flotation systems of this type are sold by the applicant company and are described, in particular, in the aforementioned work "Memento technique de l'eau" [Water treatment handbook] 10th edition, volume 2, pages 876-877. The solid particles gather together in the form of a sludge blanket 7 in the upper part of the flotation system. A portion of the sludge is recirculated via a line 8 to the inlet pipe 3 of the reactor 1. The other portion of the sludge is discharged.

The recirculation of the sludge is controlled so that the concentration of suspended matter (SM) of the effluent sent via the pipe 4 into the flotation system 7 remains between 0.3 g/L and 1.5 g/L in order to ensure correct operation of this flotation system 6. In order to exercise control, at least one probe 9 is provided for measuring the SM concentration, in particular in the anoxic treatment zone 1a. The result of the measurement is transmitted to a controller 10 or microcomputer which, as a function of the desired SM concentration in the flotation system 7, controls the degree of recirculation of the sludge by regulating the speed of a pump 11 installed in the line 8.

Figure 2:
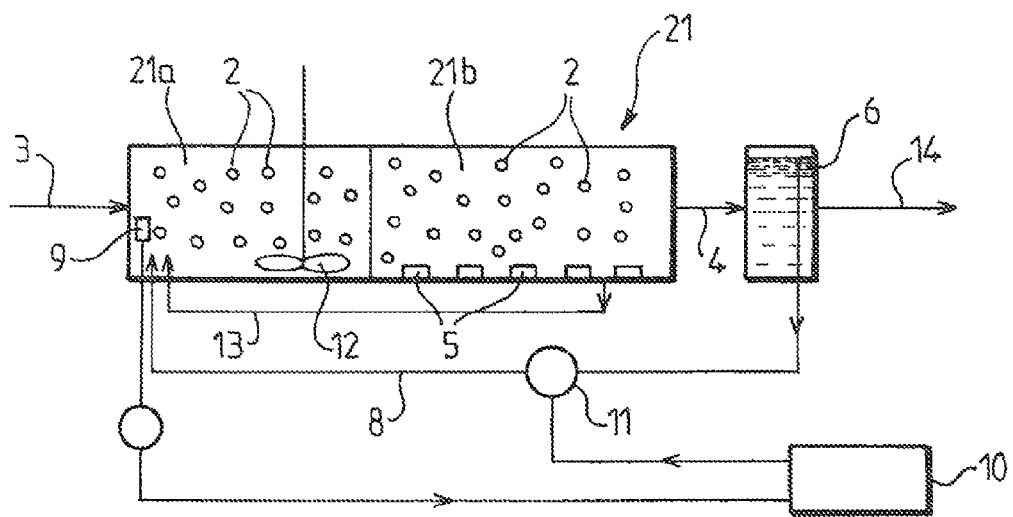
FIG. 2 is a diagram of an embodiment variant of the plant according to the invention.

FIG. 2 shows an embodiment of the plant according to which the biological reactor 21 comprises two physically separate treatment zones 21a, 21b.

The zone 21a is a non-aerated zone, that does not comprise aeration means. This zone 21a, advantageously an anoxic zone, comprises at least one stirring means 12, especially of the propeller type.

The components of FIG. 2 that are identical or that play a similar role to components already described in respect of FIG. 1 are denoted by the same reference numbers without the description thereof being repeated. The aerated zone 21b, equipped in the bottom part with aeration means 5, communicates with the zone 21a via a passage that cannot be seen in FIG. 2, equipped with a screen in order to retain the solid supports 2 in their respective part 21a and 21b.

A fraction of the nitrates produced in the second aerated treatment zone 21b is recirculated via a pipe 13 from zone 21b to zone 21a.

In the plant from FIGS. 1 and 2, the treated water is discharged from the flotation system 6 via a pipe 14.

The zone 1a or 21a upstream of the plant allows a hydrolysis of the dissolved, or even particulate organic matter conveyed by the wastewater. This pre-hydrolysis under anoxic conditions produces readily assimilated organic matter necessary for the denitrification step and improves the kinetics of nitrification via autotrophic bacteria in the aerated zone 1b.

Furthermore, a portion of the nitrates are degraded in this upstream high-loading zone, accordingly reducing the amount of supports 2 in the anoxic zone.

The complete treatment of the nitrogen (nitrification and denitrification) may be obtained either by a sequenced aeration or by a channel type configuration that allows the use of the residual carbon after the high loading for the denitrification.

EXAMPLE

The data presented below corresponds to a daily hydraulic flow of 420 m³/H, an SM concentration of 250 mg/L with a content of VM (volatile matter) of 80%. The COD of the effluent is 500 mg/L, including 40% BOD. The nitrogen concentration is 45 mg/L.

The water treatment objectives are the following: SM of 20 mg/L, BOD of 20 mg/L, NGL (global nitrogen) of 14 mg/L and PT (total phosphorus) of 2 mg/L.

The presence of a biomass of high mass loading (and therefore of low sludge age, less than three days) under anoxic conditions allows a pre-hydrolysis of close to 22% of the incoming COD, which represents a supply of readily assimilated BOD of the order of 33 mg/L. This supply of BOD is necessary in order to ensure total denitrification since the supply of readily assimilated BOD by the water to be treated (without a pre-hydrolysis step) is estimated at 70 mg/L, whereas the requirements for ensuring total denitrification are 98 mg/L.

In the case of a conventional configuration, without recirculation of high-loading free biomass, it would have been necessary to provide this complementary BOD in the form of methanol for example.

The presence, in the anoxic zone, of a free culture under high loading conditions also contributes to removing nitrates: this contribution is estimated between 10 and 20%, which represents a saving as regards supports in the anoxic zone.

In conclusion, in the calculated example given, the advantages of the proposed solution are presented in the table below:

|  | Conventional solution | Proposed solution |
| --- | --- | --- |
| Volume of the pre-anoxic zone | 4340 m³ | 980 m³ |
| Volume of the aerated zone | 2500 m³ | 1880 m³ |
| Surface area of the sludge recovery zone | 110 m² | 22 m² |
| Situation with regards to denitrification | Supply of external carbon 28 mg/L raBOD shortage | Non-limiting in carbon Production of 33 mg/L raBOD |
| Total volume of the works | 7280 m³ | 2948 m³ |

The step of pre-hydrolysis of the organic matter under anoxic conditions will favor the denitrification kinetics by providing readily assimilated BOD (abbreviated to: raBOD) and the kinetics of nitrification by limiting the supply of carbon in the aerated zone.

This action on the treatment of the carbon will furthermore play an important role in case of loading irregularities since the concentration of biodegradable carbon will be less in the aerated zone.

It is noted that the water treatment plant requires an overall size of the works of the order of 40% relative to a conventional solution.

The invention applies, in particular, to any treatment of effluent having a carbon concentration that may vary from 100 mg/L to 800 mg/L and that contains a portion of assimilable carbon of 20 to 100%, a carbon/nitrogen weight ratio greater than 3.5 and a limitless carbon/phosphorus ratio.

According to these characteristics, the treated effluent may be wastewater of effluent, industrial or agricultural origin.

The concentration of suspended matter of the effluent will be able to be controlled by the addition of a settling step upstream of any biological treatment.

The invention claimed is:

1. A process for purifying wastewater via a biological treatment that uses a set of microorganisms that have different metabolic spectra, in order to remove carbon and nitrogen, or even phosphorus, a portion of the microorganisms being fixed to movable solid supports and constituting a fluidized fixed biomass, wherein:

another portion of the microorganisms is free for an activated sludge type treatment;

a first non-aerated treatment zone (1a, 21a) is provided, followed by a second aerated treatment zone (1b, 21b);

the treated effluent is subjected to a solid/liquid separation via flotation at a rate greater than 10 m/H; and a portion of the sludge recovered by flotation is recirculated to the activated sludge treatment, this recirculation being controlled so that the SM concentration of the effluent subjected to the liquid/solid separation remains compatible with the flotation used and remains between 0.3 g/L and 1.5 g/L.

2. The process as claimed in claim 1, wherein conditions of high mass loading or free culture and a nitrogen treatment under conditions of low mass loading by the fluidized fixed biomass are coupled together.

3. The process as claimed in claim 1, wherein provision is made for the non-aerated treatment zone to be a high-loading anoxic treatment zone (1a, 21a), for removing most of the carbon and some of the nitrogen mainly by action of heterotrophic bacteria, followed by the second aerated treatment zone (1b, 21b) for removing nitrogen.

4. The process as claimed in claim 3, wherein the two treatment zones (21a, 21b) are physically separate.

5. The process as claimed in claim 4, wherein a fraction of the nitrates produced in the second aerated treatment zone is recirculated to the first anoxic treatment zone.

6. The process as claimed in claim 3, wherein the SM concentration is measured in the first high-loading anoxic treatment zone and the degree of recirculation of the sludge recovered by flotation is controlled so as to keep the SM concentration within the desired range.

7. A wastewater purification plant comprising a biological reactor containing a set of microorganisms that have different metabolic spectra, in order to remove carbon and nitrogen, or even phosphorus, a portion of the microorganisms being fixed to movable solid supports and constituting a fluidized fixed biomass, wherein:

another portion of the microorganisms is free for an activated sludge type treatment;

the biological reactor (1, 21) comprises a first non-aerated treatment zone (1a, 21a) followed by a second aerated treatment zone (1b, 21b);

the plant comprises, downstream of the biological reactor (1, 21), a flotation unit (6) having a separation rate greater than 10 m/H which receives the effluent exiting the biological reactor;

a circuit (8) is provided in order to recirculate some of the sludge recovered from the flotation unit to the biological reactor; and means (9, 10, 11) are provided for keeping the SM concentration of the effluent subjected to the liquid/solid separation between 0.3 g/L and 1.5 g/L.

8. The plant as claimed in claim 7, wherein the means for keeping the SM concentration of the effluent subjected to the liquid/solid separation within a given range comprise:

a means (9) for measuring the SM concentration in the biological reactor;

a controller (10) to which the result of the measurement is sent; and a pump (11), controlled by the controller, for the recirculation flow.

9. The plant as claimed in claim 7, wherein the first non-aerated treatment zone (1a, 21a) is a high-loading anoxic zone for removing most of the carbon and some of the nitrogen mainly by action of heterotrophic bacteria, followed by the second aerated treatment zone (1b, 21b) for removing nitrogen.

10. The plant as claimed in claim 9, wherein the two treatment zones (21a, 21b) are physically separate.

11. The plant as claimed in claim 10, wherein a fraction of the nitrates produced in the second aerated treatment zone (21b) is recirculated (8) to the first anoxic treatment zone (21a).

12. The plant as claimed in claim 9, wherein the high loading of the first anoxic treatment zone (1a, 21a) is greater than $0.4 \text{ kgBOD}_5 \cdot \text{kg}^{-1} \text{VM} \cdot \text{d}^{-1}$.

* * * * *